UNITED STATES PATENT OFFICE.

HEINRICH BRANDENBURG, OF KEMPEN-ON-THE-RHINE, GERMANY.

PROCESS FOR EXTRACTING TIN FROM IRON-CONTAINING TIN PRODUCTS.

No. 859,594.

Specification of Letters Patent.

Patented July 9, 1907.

Application filed October 25, 1906. Serial No. 340,449.

*To all whom it may concern:*

Be it known that I, HEINRICH BRANDENBURG, chemist, a subject of the King of Prussia, residing at 29 Moorenring, Kempen-on-the-Rhine, in the German Empire, have invented a new and useful Process for Extracting Tin from Iron-Containing Tin Products, such as Residues and the Like; and I do hereby declare the following to be a full, clear, and exact description of the same.

This invention relates to a process for separating the iron and tin contained in the intermediate products of the treatment of tin ore, that is to say, in waste products, residues, tin-containing slag, ashes, scraps, soot and the like.

According to this invention the said waste products are smelted with silicate of tin, which is either specially prepared for the purpose, or obtained from the slags produced during the extraction of tin by old processes, the smelting taking place preferably in the presence of a basic flux.

When the above mentioned waste products and more particularly raw tin containing large quantities of iron, are melted with silicate of tin or with a slag containing a silicate of tin, the reaction takes place in such manner that the tin of the waste products treated, and the tin contained in the slag or in the silicate in combination with the silica, appears in metallic state, while the iron is combined with the silica. Any oxid or dioxid of tin that may be mechanically dissolved in the slag, reacts in a similar manner. In this way, tin free from iron is obtained, partly consisting of the tin of the raw material, and partly of the tin of the specially produced silicate of tin, or of the oxid or dioxid of tin dissolved in the slag.

Having described my invention, what I claim as new, and desire to secure by Letters Patent of the United States is:—

1. The process for extracting tin from iron-containing tin products obtained during the treatment of tin ore, consisting in melting such iron-containing tin products with silicate of tin.

2. The process for extracting tin from iron-containing tin products obtained during the treatment of tin ore, consisting in melting such iron-containing tin products with a slag containing one or more compounds of tin and oxygen, such as tin oxid, tin dioxid, silicate of tin, and the like.

In witness whereof I have hereunto set my hand in the presence of two witnesses.

HEINRICH BRANDENBURG.

Witnesses:
AUGUST WEYLAND,
HEINRICH ZIMMERMANN.